(12) United States Patent
Kobayashi et al.

(10) Patent No.: US 7,852,603 B2
(45) Date of Patent: Dec. 14, 2010

(54) PERPENDICULAR MAGNETIC RECORDING HEAD CAPABLE OF SUPPRESSING PROBLEM SUCH AS ERASURE OF MAGNETIC DATA

(75) Inventors: Kiyoshi Kobayashi, Niigaka-ken (JP); Hiroshi Kameda, Niigata-ken (JP)

(73) Assignee: TDK Corporation, Tokyo (JP)

( * ) Notice: Subject to any disclaimer, the term of this patent is extended or adjusted under 35 U.S.C. 154(b) by 972 days.

(21) Appl. No.: 11/676,113

(22) Filed: Feb. 16, 2007

(65) Prior Publication Data
US 2007/0195455 A1   Aug. 23, 2007

(30) Foreign Application Priority Data
Feb. 17, 2006   (JP)   .............................. 2006-040533

(51) Int. Cl.
  *G11B 5/187*   (2006.01)
(52) U.S. Cl. .............................. 360/125.06; 360/125.07
(58) Field of Classification Search ............ 360/125.06, 360/125.07, 125.08, 125.1, 125.12
See application file for complete search history.

(56) References Cited

U.S. PATENT DOCUMENTS

| 7,295,401 B2 * | 11/2007 | Jayasekara et al. ..... 360/125.08 |
|---|---|---|
| 7,646,564 B2 * | 1/2010 | Maruyama et al. ..... 360/125.07 |
| 2003/0021063 A1 | 1/2003 | Kuroda et al. |
| 2004/0021985 A1 | 2/2004 | Pokhil et al. |
| 2005/0013044 A1 | 1/2005 | Hirata et al. |
| 2005/0286170 A1 * | 12/2005 | Hirata et al. ................. 360/125 |
| 2006/0098335 A1 * | 5/2006 | Hirata et al. ................. 360/125 |
| 2006/0103982 A1 * | 5/2006 | Nakamoto et al. .......... 360/126 |
| 2006/0164756 A1 * | 7/2006 | Kameda et al. ............. 360/125 |

FOREIGN PATENT DOCUMENTS

| JP | 02-210609 | 8/1990 |
|---|---|---|
| JP | 2003-36503 | 2/2003 |
| JP | 2004-71139 | 3/2004 |
| JP | 2004-185742 | 7/2004 |
| JP | 2005-38535 | 2/2005 |
| JP | 2006-4603 | 1/2006 |

* cited by examiner

*Primary Examiner*—Jefferson Evans
(74) *Attorney, Agent, or Firm*—Brinks Hofer Gilson & Lione

(57) ABSTRACT

A perpendicular magnetic recording head is provided. The perpendicular magnetic recording head includes a main magnetic pole layer overlapped with a sub-yoke layer. The sub-yoke layer having a multiple-magnetic domain includes a magnetic domain having dominant track-widthwise component in contact with a front end face of the sub-yoke layer. A main magnetic pole layer 24 is overlapped with the magnetic domain 35*b* and is affected by the magnetic domain 35*b*.

16 Claims, 15 Drawing Sheets

PERPENDICULAR MAGNETIC RECORDING HEAD CAPABLE OF SUPPRESSING PROBLEM SUCH AS ERASURE OF MAGNETIC DATA

This application claims the benefit of Japanese Patent Application No. 2006-040533 filed Feb. 17, 2006, which is hereby incorporated by reference.

TECHNICAL FIELD

The present invention relates to a perpendicular magnetic recording head which performs a recording operation by applying a magnetic field perpendicularly to a surface of a recording medium such as a disk, and more particularly, a perpendicular magnetic recording head capable of suppressing a problem such as an erasure of magnetic data.

BACKGROUND

FIG. 16 is a fragmentary cross-sectional view of a known recording magnetic recording head as viewed from a direction parallel to a film thickness direction (Z direction shown in FIG. 16) to a height direction (Y direction shown in FIG. 16).

In FIG. 16, reference numeral 1 represents a return yoke layer, reference numeral 2 represents a main magnetic pole layer, and reference numeral 3 is a sub-yoke layer. As shown in FIG. 16, a front end face 3a of the sub-yoke layer 3 retreats in a height direction (Y direction shown in FIG. 16) from a surface opposed to the recording medium H1a and the main magnetic layer 2 is formed on the sub-yoke layer 3. A front end face 2a of the main magnetic pole layer 2 is exposed from the opposed surface H1a. A nonmagnetic pole gap layer 4 is formed on the main magnetic pole layer 2 and a coil layer 5 is formed on the nonmagnetic pole gap layer 4. A coil insulating layer 6 is formed on the coil layer 5.

The return yoke layer 1 is formed on the coil insulating layer 6. A front end portion 1a of the return yoke layer 1 is opposed to the main magnetic pole layer 2 with the nonmagnetic gap layer 4 interposed therebetween in the opposed surface H1a. A rear end portion 1b of the return yoke layer 1 is magnetically coupled with the main magnetic pole layer 2.

The main magnetic pole layer 2 is formed of a magnetic material having saturation magnetic flux density (Bs) higher than the sub-yoke layer 3. However, since the main magnetic poly layer 2 has low magnetic permeability, the sub-yoke layer 3 formed of a magnetic material having high permeability is overlapped with the main magnetic pole layer 2 and large flux properly leads to the front end portion 2b of the main magnetic pole layer 2. Therefore, it is possible to improve recording efficiency.

As shown in FIG. 16, a flux path leads from the return yoke layer 1 to the main magnetic pole layer 2 at the time of a recording operation. The recording medium M includes a hard film Ma having remanent magnetization thereon and a soft film Mb having high magnetic permeability therein. Magnetic flux φ is concentrated on the front end face 2a of the opposed surface H1a in the main magnetic pole layer 2. The magnetic flux φ leads from the main magnetic pole layer 2 to the return yoke layer 1 via the hard film Ma and the soft film Mb. The hard film Ma is perpendicularly magnetized by the magnetic flux φ. The magnetic data is recorded in the recording medium M.

[Patent Document 1] JP-A-2003-36503 (US2003021063A1)

[Patent Document 2] JP-A-2004-71139 (US2004021985A1)

[Patent Document 3] JP-A-2005-38535 (US2005013044A1)

FIG. 17A is a plan view of the sub-yoke layer 3 and FIG. 17B is a plan view of the main magnetic pole layer 2 overlapped with the sub-yoke layer 3. FIG. 17 shows the magnetic domain structure of the main magnetic pole layer 2 and the sub-yoke layer 3 at the time when current does not flow on the coil layer 5 and a recording magnetic field from the coil layer 5 is not applied to the main magnetic pole layer 2 and the sub-yoke layer 3, that is, at the time of a nonrecording operation. The arrows shown in FIG. 17 represent a spontaneous magnetization direction in each magnetic domain.

As shown in FIG. 17A, the front end face 3a of the sub-yoke layer 3 (X direction shown in FIG. 17A) is formed of an inclined surface inclined in the height direction (Y direction shown in FIG. 17A) toward opposed end faces 3b of the sub-yoke layer 3 approximately from the center of a track width direction (X direction shown in FIG. 17A). For example, an inclination angle θ3 to the track width direction of the front end face 3a (X direction shown in FIG. 17A) is approximately 50 degrees. As shown in FIG. 17, the sub-yoke layer 3 is subjected to multi-magnetic domain states and has magnetic domains 3c. Magnetic domains 3c have a strong component in the height direction (Y direction shown in FIG. 17) of a magnetic moment (or has an only component in the height direction thereof) and occupies a large area in the vicinity of the front end face 3a.

As shown in FIG. 17B, the main magnetic pole layer 2 includes the elongated front end portion 2b having a track width Tw and a large-width portion 2c formed in the height direction (Y direction shown in FIG. 17B) of the front end portion 2b and has a width in the track width direction (X direction shown in FIG. 17B) larger than the width of the front end portion 2b. The large-width portion 2c shown in FIG. 17B has the same shape as the sub-yoke layer 3 shown in FIG. 17A. As a result, the main magnetic pole layer 2 also is subjected to the multi-magnetic domain state at the time of the nonrecording operation as shown in FIG. 17B.

As shown in FIG. 17B, since the main magnetic pole layer 2 is subjected to the multi-magnetic domain state and has magnetic domains 2d and 2d having the strong component in the height direction (Y direction shown in FIG. 17B) in the vicinity of the front end portion 2b, the front end portion 2b is easily magnetized parallel to the height direction. Therefore, the magnetic flux leaks to the recording medium M from the front end portion 2b at the time of the nonrecording operation, thereby causing the magnetic data recorded in the recording medium M to be erased (Pole Erasure).

Accordingly, the magnetic domain formed on the main magnetic pole layer 2 becomes smaller, thereby reducing the pole erasure.

Since the main magnetic pole layer 2 is overlapped with the sub-yoke layer 3 as shown in FIG. 16, the main magnetic pole layer 2 is affected by the magnetic domain structure of the sub-yoke layer 3, and more particularly, the main magnetic pole layer 2 is strongly affected by the magnetic domain 3c parallel to the height direction in the vicinity of the front end face 3a of the sub-yoke layer 3. Accordingly, the main magnetic pole layer 2 is easily magnetized parallel to the height direction, whereby it is still difficult to properly solve the pole erasure.

The patent documents does not disclose anyway to solve the pole erasure in consideration of the magnetic domain structure of the sub-yoke layer 3 and a position where the main magnetic pole layer 2 overlapped with the sub-yoke layer 3 is formed.

SUMMARY

The present embodiments may obviate one or more of the drawbacks or limitations inherent in the related art. For example, one embodiment provides a perpendicular magnetic recording head capable of suppressing an erasure of magnetic data by properly controlling a magnetic domain of a sub-yoke layer and making an area where the main magnetic pole layer is overlapped with the sub-yoke layer appropriate.

In one embodiment a perpendicular magnetic recording head includes a main magnetic pole layer. A sub-yoke layer is formed in contact with the main magnetic pole layer. A coil layer applies a magnetic field to the main magnetic pole layer and the sub-yoke layer. The main magnetic pole layer has an elongated front end portion restricting a track width Tw and a large-width portion having a width larger in a track width direction than that of the front end portion, which is provided in the rear of a height side of the front end portion. A front end face of the sub-yoke layer facing an opposed surface retreats in a height direction from the opposed surface. The large-width portion of the main magnetic pole layer is overlapped with the sub-yoke layer, and the front end portion projects in the front of the front end face of the sub-yoke layer so as to be exposed from the opposed surface. The sub-yoke layer has a multi-magnetic domain structure and the magnetic domain having a track-widthwise component larger than a heightwise component is formed in contact with at least a part of the front end face when the heightwise component of a magnetic moment is compared with the track-widthwise component of the moment. An area equal to or larger than a half of a region of the main magnetic pole layer overlapped with the sub-yoke layer is overlapped with the magnetic domain having the larger track-widthwise component.

In one embodiment, the sub-yoke layer has the magnetic domain having a track-widthwise component larger than a heightwise component is formed in contact with at least a part of the front end face when the heightwise component of a magnetic moment is compared with the track-widthwise component of the moment. In related art, the magnetic domain having a large heightwise component is formed in the vicinity of the front end face of the sub-yoke layer, but in the present embodiment, the magnetic domain of the sub-yoke layer is controlled as described above.

In one embodiment, the main magnetic pole layer includes the front end portion restricting the track width Tw and the large-width portion having the track-widthwise width larger than the front end portion, the large-width portion is overlapped with the sub-yoke layer, and the front end portion protrudes in the front of the front end face of the sub-yoke layer.

An area equal to or more than a region of the main magnetic pole layer overlapped with the sub-yoke layer is overlapped with the magnetic domain having the track-widthwise component larger than the heightwise component. As a result, since the large-width portion of the main magnetic pole layer is strongly influenced by the magnetic domain having the track-widthwise component larger than the heightwise component, the main magnetic pole layer is magnetized in a direction parallel to the track width direction (or direction similar to the track width direction) more easily than in related art. Accordingly, it is possible to suppress the leakage of a magnetic flux from the front end portion of the main magnetic pole layer to the recording medium at the time of the non-recording operation, thereby properly suppressing a problem such as an erasure of magnetic data recorded in the recording medium.

In another embodiment, a perpendicular magnetic recording head includes a main magnetic pole layer. A sub-yoke layer is formed in contact with the main magnetic pole layer. A coil layer applies a magnetic field to the main magnetic pole layer and the sub-yoke layer. The main magnetic pole layer has an elongated front end portion restricting a track width Tw and a large-width portion having a width larger in a track width direction than that of the front end portion, which is provided in the rear of a height side of the front end portion. A width of the sub-yoke layer in the track width direction is larger than the width of the large-width portion. A front end face of the sub-yoke layer facing an opposed surface retreats in a height direction from the opposed surface. The large-width portion of the main magnetic pole layer is overlapped with the sub-yoke layer, and the front end portion projects in the front of the front end face of the sub-yoke layer so as to be exposed from the opposed surface.

At least a part of the front end face is formed at the inclination angle $\theta 1$ about a direction parallel to the track width direction in the range of 0 to 30 degrees, and the front end face formed at the inclination angle $\theta 1$ is opposed to the large-width portion to be parallel to the height direction as viewed from a plane and has a width equal to or larger than of the width of the large-width portion. The main magnetic pole layer is overlapped with the region of the front end face equal to or smaller than a half of a heightwise length of the sub-yoke layer.

In one embodiment, the front end face of the sub-yoke layer is retreated in the height direction from the opposed surface and the inclination angle $\theta$ to the track width direction is in the range of 0 to 30 degrees. As a result, the magnetic domain having a track-widthwise component larger than a heightwise component is easily formed in contact with at least a part of the front end face when the heightwise component of a magnetic moment is compared with the track-widthwise component of the moment. For example, it is possible to form the magnetic domain having the track-widthwise component larger than the heightwise component in the vicinity of the front end face of the sub-yoke layer by restricting the inclination angle $\theta 1$ of the front end face.

In one embodiment, the main magnetic pole layer includes the front end portion restricting the track width Tw and the large-width portion having the track-widthwise width larger than the front end portion. The large-width portion is overlapped with the sub-yoke layer. The front end portion protrudes in the front of the front end face of the sub-yoke layer.

The main magnetic pole layer is overlapped with the region of the front end face equal to or smaller than a half of a heightwise length of the sub-yoke layer. As a result, since the large-width portion of the main magnetic pole layer is strongly influenced by the magnetic domain having the track-widthwise component larger than the heightwise component formed in the vicinity of the front end face of the sub-yoke layer, the main magnetic pole layer is magnetized in a direction parallel to the track width direction (or direction similar to the track width direction) more easily than in related art. Accordingly, it is possible to suppress the leakage of a magnetic flux from the front end portion of the main magnetic pole layer to the recording medium at the time of the non-recording operation, thereby properly suppressing a problem such as an erasure of magnetic data recorded in the recording medium.

In one embodiment, it is preferable that the sub-yoke layer has the multi-magnetic domain structure and the magnetic domain having the track-widthwise parallel component larger than the heightwise component is formed in contact with at least a part of the front end face when the heightwise component of the magnetic moment is compared with the track-widthwise component of the moment. An area equal to or larger than a half of a region of the main magnetic pole layer overlapped with the sub-yoke layer is overlapped with the magnetic domain having the larger track-widthwise component since it is possible to magnetize the main magnetic pole layer in a direction parallel to the track width direction (or direction similar to the track width direction) more properly.

In one embodiment, the entire area of the main magnetic pole layer overlapped with sub-yoke layer is overlapped with the magnetic domain having the track-widthwise component larger than the heightwise component. As a result, since the main magnetic pole layer is not influenced by the magnetic domain having the heightwise component larger than the track-widthwise component of the sub-yoke layer, it is possible to more effectively magnetize the main magnetic pole layer in a direction parallel to the track width direction (or direction similar to the track width direction) as a whole. Therefore, is possible to suppress the leakage of the magnetic flux from the front end portion of the main magnetic pole layer to the recording medium.

In one embodiment, the ratio of the width in the track width direction of the sub-yoke layer to the heightwise length of the sub-yoke layer (the width/the length) is equal to or larger than 1. As a result, since the area of the magnetic domain having the track-widthwise component larger than the heightwise component can be larger properly and the main magnetic pole layer is easily overlapped with the magnetic domain the track-widthwise component larger than the heightwise component, it is possible to properly and easily control the position of the main magnetic pole layer to the sub-yoke layer.

In one embodiment, it is possible to suppress the leakage of the magnetic flux from the front end portion of the main magnetic pole layer to the recording medium at the time of the non-recording operation, thereby properly suppressing the problem such as the erasure of the magnetic data recorded in the recording medium.

DETAILED DESCRIPTION

Figure 1:
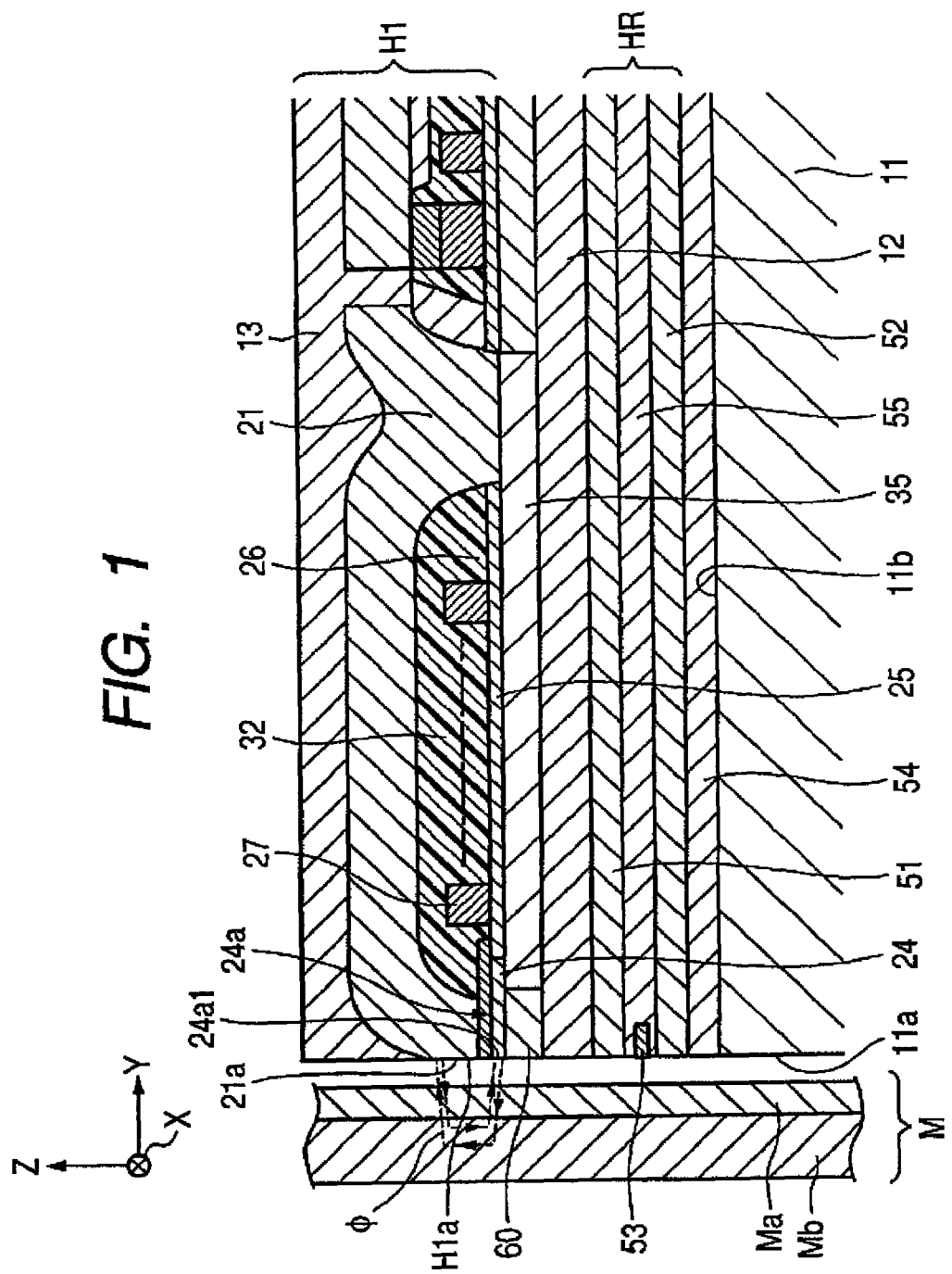
FIG. 1 is a fragmentary cross-sectional view of a complex magnetic head having a perpendicular magnetic recording head according to a first embodiment as viewed from a height direction (Y direction shown in the drawing) parallel to a film thickness direction.
Figure 2:
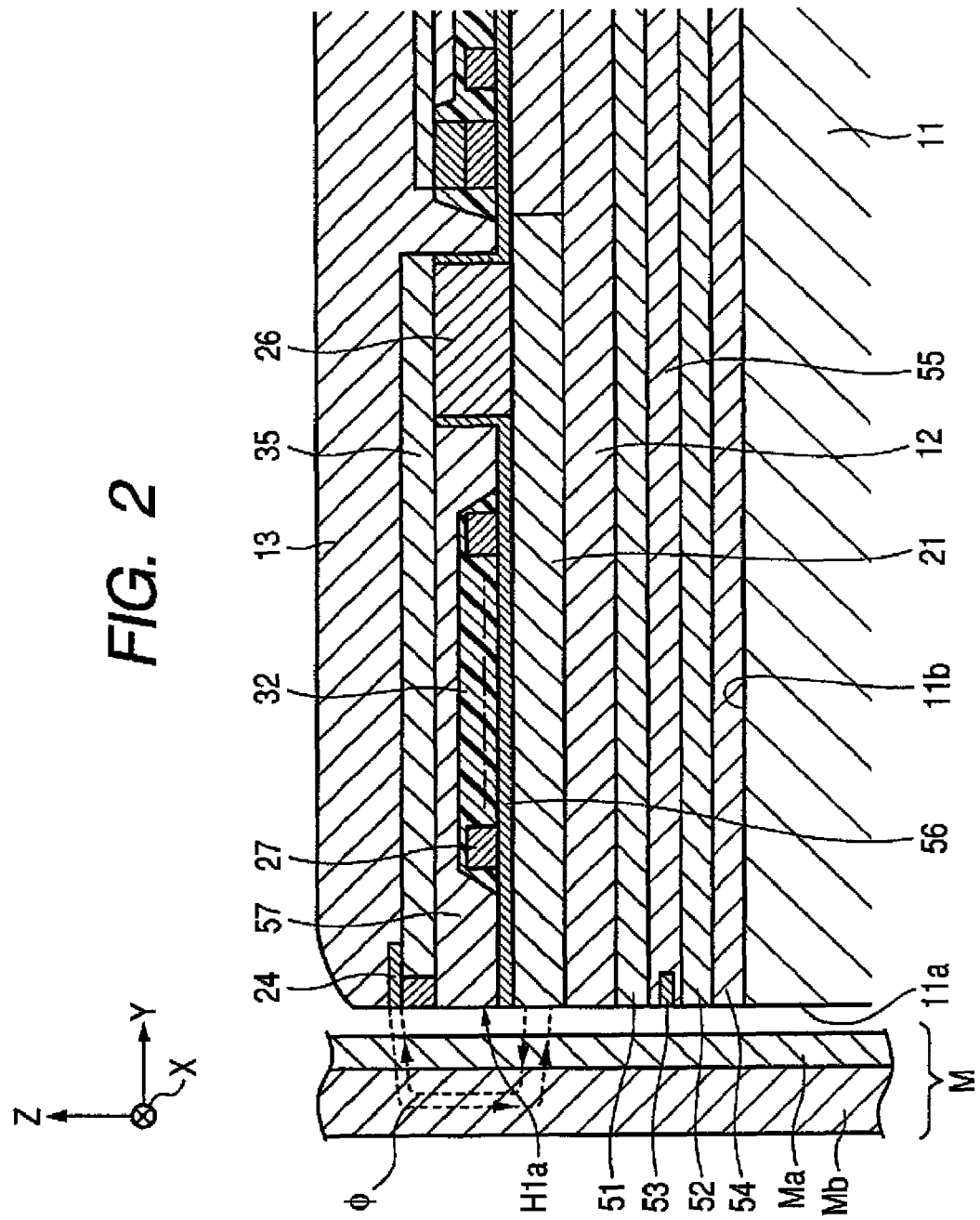
FIG. 2 is a fragmentary cross-sectional view of a complex magnetic head having a perpendicular magnetic recording head according a second embodiment as viewed from a direction parallel to a film thickness direction (Z direction shown in the drawing) to a direction parallel to a height direction (Y direction shown in the drawing).
Figure 3:
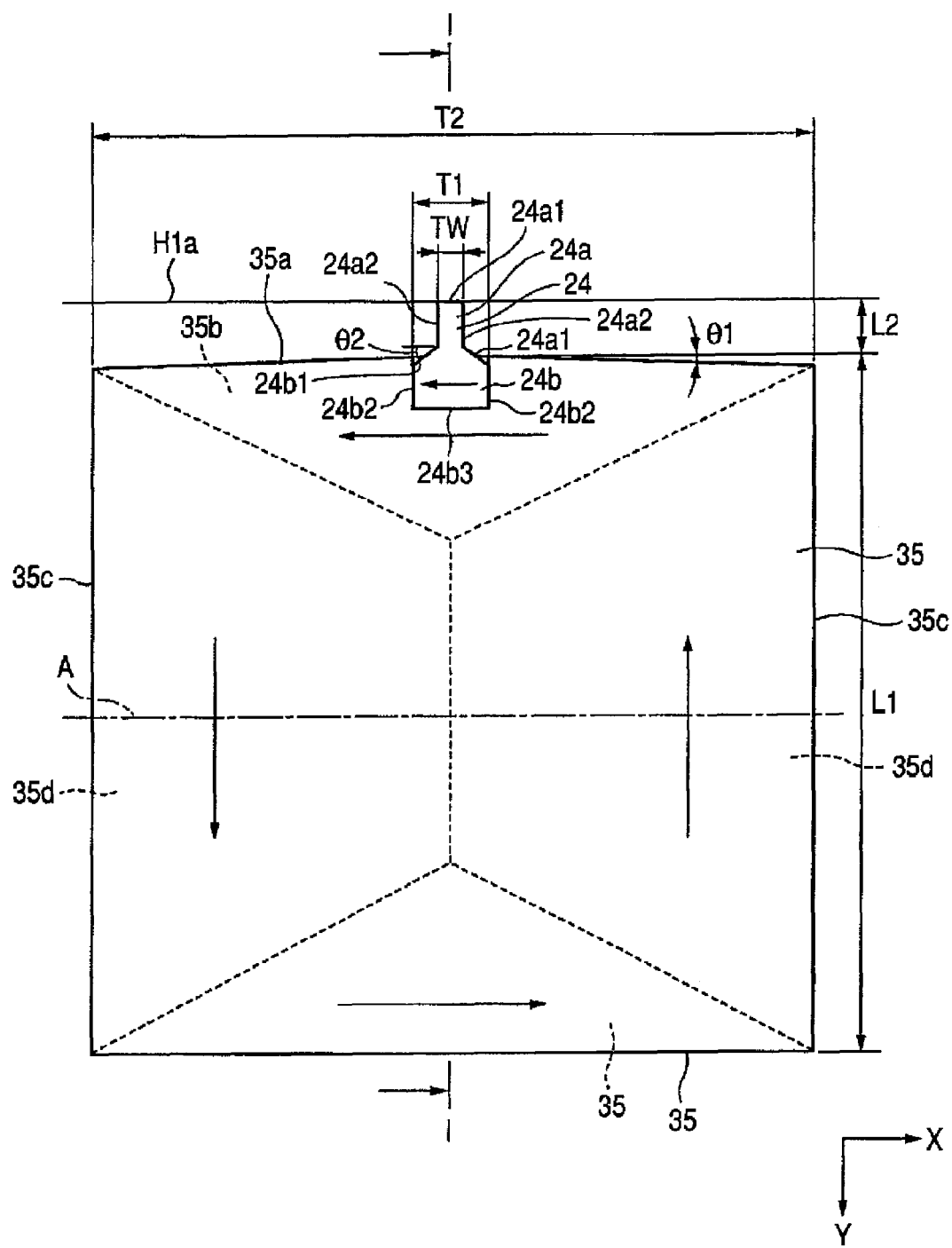
FIG. 3 is a plan view showing magnetic domain structures of a main magnetic pole layer and a sub-yoke layer.

FIG. 1 is a fragmentary cross-sectional view of a complex magnetic head having a perpendicular magnetic recording head according to a first embodiment as viewed to a height direction (Y direction shown in the drawing) from a direction parallel to a film thickness direction (Z direction shown in the drawing) (a perpendicular cross-sectional view in an arrow direction taken along line I-I shown in FIG. 3). FIG. 2 is a fragmentary cross-sectional view of a complex magnetic head having a perpendicular magnetic recording head according a second embodiment as viewed from a direction parallel to a film thickness direction (Z direction shown in the drawing) to a direction parallel to a height direction (Y direction shown in the drawing). FIG. 3 is a plane view of a main magnetic pole layer and a sub-yoke layer.

In a perpendicular magnetic recording head H1 shown in FIG. 1, a hard film Ma of a recording medium M is perpendicularly magnetized by applying a perpendicular magnetic field to the recording medium M.

The recording medium M having, for example, a disk shape includes the hard film Ma having high remanent magnetization thereon and a soft film Mb having high magnetic permeability therein. In the recording medium M, the center of a disk rotates on the center of a disk serving as the rotation axis.

A slider 11 is formed of nonmagnetic materials such as $Al_2O_3$ and $SiO_2$. An opposed surface 11a of the slider 11 is opposed to the recording medium M. The slider 11 is levitated from the surface of the recording medium M or the slider 11 slides to the recording medium M by the airflow of the surface when the recording medium M rotates. In FIG. 1, a downward direction (direction opposed to Z direction shown in the drawing) is a leading side and an upward direction (Z direction shown in the drawing).

A nonmagnetic insulating layer 54 formed of an inorganic material such as $Al_2O_3$ or $SiO_2$ is provided on the trailing end face (top surface) 11b of the slider 11. A reading unit $H_R$ is provided on the nonmagnetic insulating layer 54.

The reading unit HR includes a lower shield layer 52, an upper shield layer 51, and a reading element 53 in an inorganic insulating layer (gap insulating layer) 55 disposed between the lower shield layer 52 and the upper shield layer 51. The reading element 53 is magneto-resistance effect elements such as AMR, GNR, and TMR.

A separating layer 12 formed of the insulating material such as $Al_2O_3$ or $SiO_2$ is provided on the upper shield layer 51.

A sub-yoke layer 35 is formed on the separating layer 12. The sub-yoke layer 35 is substantially rectangular. As shown in FIGS. 1 to 3, a front end face 35a facing an face H1a (hereinafter, referred to as "opposed surface H1a") opposed to the recording medium of the sub-yoke layer 35 retreats in the height direction (Y direction shown in the drawing) from the opposed surface H1a by a predetermined distance. Accordingly, even if a magnetic flux leaks from the front end face 35a, it is possible to suppress an influence on the recording medium M. A minimum retreating distance L2 (see FIG. 3) from the opposed surface H1a of the front end face 35a is approximately 0.3 μm to 3.0 μm. An insulating layer 60 formed of $Al_2O_3$ is buried between the front end face 35a and the opposed surface H1a of the sub-yoke layer 35.

The sub-yoke layer 35 is coated with a magnetic material having magnetic permeability higher than the main magnetic pole layer 24 to be described below. The sub-yoke layer 35 is formed of a NiFe alloy.

As shown in FIG. 1, the top surfaces of the insulating layer 60 and the sub-yoke layer 35 are planarized and the main magnetic pole layer 24 is formed thereon.

As shown in FIG. 3, the main magnetic pole layer 24 is even smaller than the sub-yoke layer 35. As shown in FIG. 3, the main magnetic pole layer has an elongated front end portion 24a restricting a track width Tw and a large-width portion 24b having a (maximum) width T1 larger in a track width direction (X direction shown in the drawing) than the maximum width of the front end portion 24a, which is provided in the rear of the height direction of the front end portion 24a.

As shown in FIGS. 1 and 3, the front end face 24a1 of the front end portion 24a is exposed from the opposed surface H1a. In an embodiment shown in FIG. 3, the front end portion 24a is formed in a constant width (=Tw) in the height direction. The width of a side end face 24a2 of the front end portion 24a may be inclined in the track width direction to become larger gradually as going in the height direction (Y direction shown in the drawing).

As shown in FIG. 3, the width of the front end face 24b1 facing the opposed surface H1a of the large-width portion 24b is formed in an inclined surface to become larger gradually as going in the height direction from the rear end of the front end portion 24a. The side end face 24b2 contacting the front end face 24b1 is provided parallel to the height direction. Accordingly, the large-width portion 24b becomes larger gradually to a halfway in the height direction from the rear end of the front end portion 24a and is formed in a constant width to the rear end from the halfway in the height direction. The side end face 24b2 may not be formed in the large-width portion 24b. For example, in the expansion 24b, the planar shape of the inclined front end face 24b1 and the rear end face 24b3 has a substantially triangular shape. The front end face 24b1 of the large-width portion 24b may not be inclined or is formed parallel to the track width direction (X direction shown in the drawing). The side end face 24b2 is not formed parallel to the height direction (Y direction shown in the drawing) the side end face 24b2 may be a little inclined in the track width direction (in this case, the inclination angle of the side end face 24b2 to the track width direction is larger than the inclination angle θ2 of the front end face 24b1 to the track width direction). Therefore, the planar shape of the large-width portion 24b has a substantially rectangular shape, a substantially quadrate shape, and a substantially trapezoidal shape.

As shown in FIG. 3, the expansion 24b of the main magnetic pole layer 24 is overlapped with the proximity of the front end face 35a of the sub-yoke layer 35. The front end portion 24a of the main magnetic pole layer 24 projects in the front of the front end face 35a of the sub-yoke layer 35. The front end face 24a1 of the front end portion 24a is exposed from the opposed surface H1a.

The main magnetic pole layer 24 is coated with a ferromagnetic material and is formed of a CoFe alloy having saturation magnetic flux density (Bs) higher than the sub-yoke layer 35.

A nonmagnetic gap layer 25 is formed from the main magnetic pole layer 24 through the sub-yoke layer 35. The gap layer 25 is formed of insulating materials such as $Al_2O_3$ or $SiO_2$. A coil layer 27 of a nonmagnetic material is formed on the sub-yoke layer 35 in the rear of the height direction of the main magnetic pole layer 24 with the gap layer 25 interposed therebetween.

The gap layer 25 and a coil insulating foundation layer on (or under) the gap layer 25 may be overlapped with each other between the coil layer 27 and the sub-yoke layer 35. In an embodiment shown in FIG. 1, the coil layer 27 is a plane spirally formed in the vicinity on the periphery of the rear end portion of a return yoke layer 21 on the gap layer 25. However, the coil layer 27 is not limited to the embodiment shown in FIG. 1. For example, a plurality of lines of lower coil layers are formed on the lower side of the sub-yoke layer 35 and a plurality of lines of upper coil layers are formed on the upper side of the sub-yoke layer 35. The lower coil layers and the upper coil layers are in contact with each other spirally and windingly on the sub-yoke layer 35 or the main magnetic pole layer 24 serving as the center axis.

As shown in FIG. 1, the coil layer 27 is covered with a coil insulating layer 32. It is preferable that the coil insulating layer 32 is formed of an organic insulating material. The coil insulating layer 32 is not formed in the vicinity of the opposed surface H1a and in the rear end portion in the height direction of the sub-yoke layer 35.

As shown in FIG. 1, the return yoke layer 21 is coated on the coil insulating layer 32. The return yoke layer 21 is formed with the gap layer 25 interposed therebetween in the opposed surface H1a. The return yoke layer 21 and the sub-yoke layer 35 are in magnetic contact with each other in the heightwise rear end. The return yoke layer 21 serves as a shield without a magnetic contact.

As shown in FIG. 1, a protective layer 13 formed of $Al_2O_3$ is provided on the return yoke layer 21.

The front end face 21a of the return yoke layer 21 is formed sufficiently larger than the front end face 24a1 of the front end portion 24a in the main magnetic pole layer 24. When current flows on the coil layer 27 and a recording magnetic field is generated, the recording magnetic field is inducted to the sub-yoke layer 35 and the main magnetic pole layer 24 and a magnetic path passing through the return layer 21, the sub-yoke layer 35, and the main magnetic pole layer 24 sequentially is formed.

The sub-yoke layer 35 has magnetic permeability higher than the main magnetic pole layer 24 and leads the magnetic flux to the main magnetic pole layer 24. In the main magnetic pole layer 24 having high saturation magnetic flux density, the magnetic flux is concentrated on the front end portion 24a, the magnetic flux φ is discharged perpendicularly to the recording medium M and returns to the return yoke layer 21 through the hard film Ma and the soft film Mb. By the configuration described above, magnetic data is recorded in the hard film Ma.

A perpendicular magnetic recording head H1 according to the present embodiment will be described. The perpendicular magnetic recording head H1 according the present embodiment has at least one of (1) or (2) described below.

(1) The main magnetic pole layer 24 is provided on the elongated front end portion 24a restricting the track width Tw and in the rear of the height side of the front end portion 24a. The main magnetic pole layer 24 has a large-width portion 24b having a track-widthwise width larger than the front end portion 24a. The front end face 35a facing the opposed surface H1a of the sub-yoke layer 35 retreats in the height direction from the opposed surface H1a. The large-width portion 24b of the main magnetic pole layer 24 is overlapped with the sub-yoke layer 35. The front end portion 24a projects in the front of the front end face 35a of the sub-yoke layer 35 so as to be exposed from the opposed surface H1a. The sub-yoke layer 35a has a multi-magnetic domain structure and the magnetic domain having a track-widthwise component larger than a heightwise component is formed in contact with at least a part of the front end face 35a when the heightwise component of a magnetic moment is compared with the track-widthwise component of the moment. An area equal to or larger than a half of a region of the main magnetic pole layer 24 overlapped with the sub-yoke layer 35 is overlapped with the magnetic domain having the larger track-widthwise component.

As shown in FIGS. 1 and 3, the main magnetic pole layer 24 is even smaller than the sub-yoke layer 35. As shown in FIGS. 1 and 3, the front end face 35a facing the opposed surface H1a of the sub-yoke layer 35 retreats in the height direction from the opposed surface H1a.

When current does not flow on the coil layer 27 and the recording magnetic field from the coil layer 27 does not flow on the sub-yoke layer 35, the sub-yoke layer 35 is subjected to the multi-magnetic domain state as shown in FIG. 3. As the inclination angle θ1 of the front end face 35a decreases, for example, when the front end face 35a is close to the track width direction (X direction shown in the drawing), the magnetic domain having the larger track-widthwise component (magnetic domain having dominant track-widthwise parallel component) 35b is formed on the front end face 35a when the heightwise component of a magnetic moment is compared with the track-widthwise component of the moment. The magnetic domain having the "larger track-widthwise component" has even the heightwise component. The magnetic domain having the larger track-widthwise component may have only the track-widthwise component without the heightwise component.

The magnetic domain 35b is in contact with at least a part of the front end face 35a and is formed the rear end face 35e and is widely formed on the opposed sides of the track width direction from the center of the track width direction. For example, the magnetic domain 35b is a substantially triangular shape projecting toward the rear end face 35e shown in FIG. 3.

In FIG. 3, the sub-yoke layer 35 is divided into four magnetic domains. Two magnetic domains 35d, 35d contacting the height side of the magnetic domain 35b have the dominant heightwise component and the magnetic domain 35f formed on the rear end face 35e of the sub-yoke layer 35 has the dominant track-widthwise component. Arrows shown in FIG. 3 represent directions of spontaneous magnetizations in the respective magnetic domains. The spontaneous magnetization is represented by the vector of a magnetic moment. In the magnetic domain 35d, the side end face 35c of the sub-yoke layer 35 is formed parallel to the height direction (Y direction shown in the drawing) and the spontaneous magnetization of the magnetic domain 35d is substantially parallel to the height direction by magnetic anisotropy. In the magnetic domain 35f, the rear end face 35e of the sub-yoke layer 35 is formed parallel to the track-widthwise direction (X direction shown in the drawing) and the spontaneous magnetization of the magnetic domain 35f is substantially parallel to the track width direction by the magnetic anisotropy.

In the embodiment shown in FIG. 3, since the large-width portion 24b of the main magnetic pole layer 24 is overlapped with the magnetic domain 35b having the dominant track-widthwise component, which is formed in the vicinity of the front end face 35a, the large-width portion 24b is influenced only by the magnetic domain 35b. On the contrary, the large-width portion 24b is not influenced by the magnetic domain 35d having dominant heightwise component. Accordingly, the main magnetic pole layer 24 is easily magnetized in a direction parallel to the track width direction (X direction shown in the drawing) (or direction similar to the track width direction) as a whole. The main magnetic pole layer 24 is even smaller than the sub-yoke layer 35, but the large-width portion 24b is properly influenced by the magnetic domain 35b by providing the large-width portion 24b having a width larger than the front end portion 24a on the main magnetic pole layer 24. Therefore, it is possible to effectively magnetize the entire main magnetic pole layer 24 in a direction parallel to the track width direction. In addition, since the large-width portion 24b does not have an elongated shape like the front end portion 24a, the large-width portion 24b is easily magnetized in the track width direction in spite of shape anisotropy.

In one embodiment, the main magnetic pole layer 24 does not have a single magnetic structure, but may have the multi-magnetic domain structure. In this embodiment, the large-width portion 24b is properly influenced by the magnetic domain 35b having dominant track-width component. Accordingly, the magnetic domain having dominant track-width component occupies a large area in the main magnetic pole layer 24. The inclination angle θ2 to the track width direction (X direction shown in the drawing) of the front end face 24b1 in the large-width portion 24b is formed in the range of 0 to 30 degrees. Therefore, the magnetic domain having dominant track-widthwise component is formed in a very large area of the large-width portion 24b.

In the present embodiment, it is possible to magnetize the main magnetic pole layer 24 in the track width direction (or direction at least similar to the track width direction) and suppress the leakage of a magnetic flux from the front end portion 24a of the main magnetic pole layer 24 to the recording medium at the time of a nonrecording operation, thereby properly suppressing a problem such as an erasure of magnetic data recorded in the recording medium.

Figure 4:
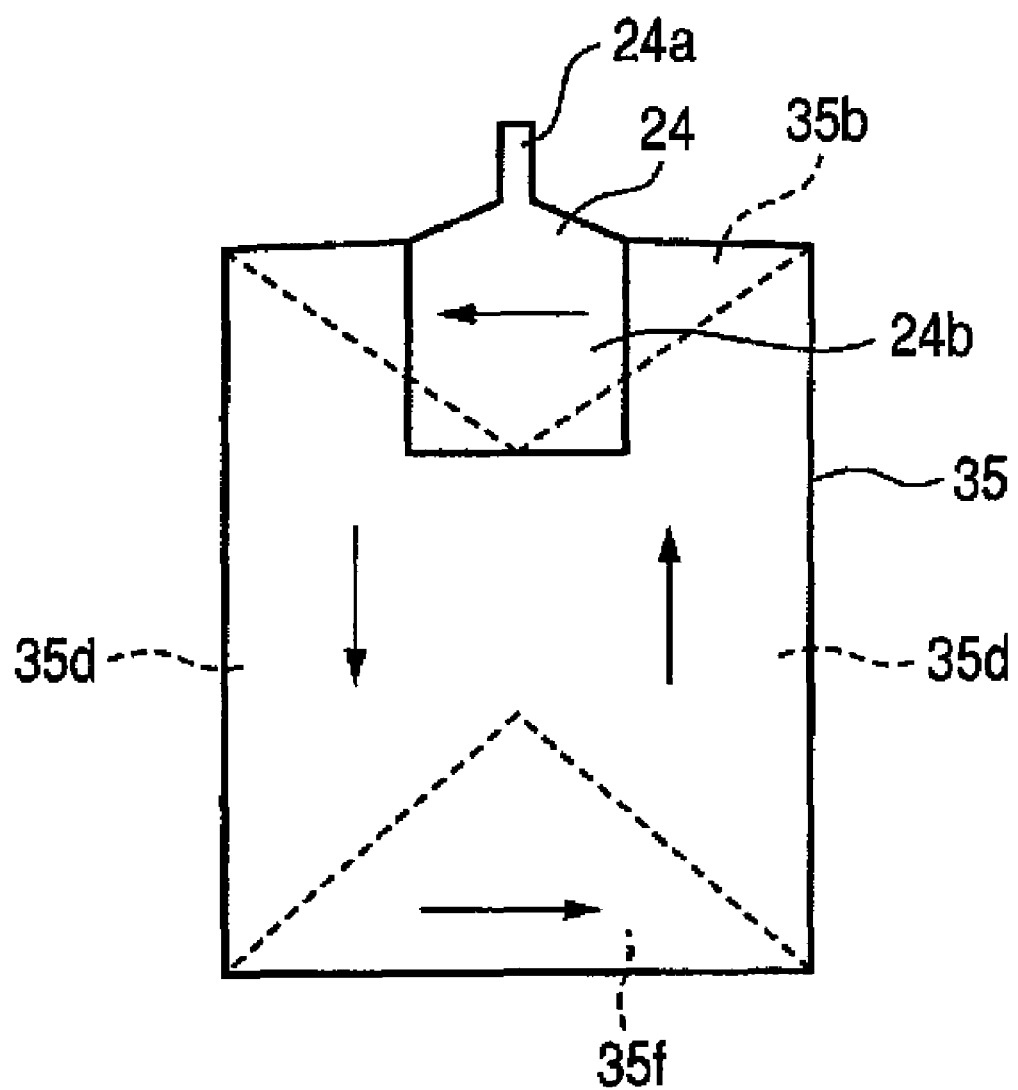
FIG. 4 is a plan view of a sub-yoke layer and a main magnetic pole layer according to one embodiment.

In the embodiment shown in FIG. 3, an entire region of the main magnetic pole layer 24 overlapped with the sub-yoke layer 35 is overlapped with the magnetic domain 35b having dominant track-widthwise component. The main magnetic pole layer 24 is not influenced by the magnetic domain 35d having dominant heightwise component of the sub-yoke layer 35. In addition, for example, as shown in FIG. 4, a part of the large-width portion 24b in the main magnetic pole layer 24 may be overlapped with the magnetic domain 35d having dominant heightwise component formed on the sub-yoke layer 35. It is preferable that an area equal to or larger than a half of a region of the main magnetic pole layer 24 overlapped with the sub-yoke layer 35 is overlapped with the magnetic domain 35b facing the track width direction. As a result, in the main magnetic pole layer 24, the influence of the main domain 35b facing the track width direction becomes stronger than the influence of the magnetic domain 35d facing the height direction on. Therefore, the main magnetic pole layer 24 is easily magnetized in the track width direction (or direction similar to the track width direction).

Even if the main magnetic pole layer 24 is subjected to the multi-magnetic domain structure, the area of the magnetic domain facing the track width direction becomes larger. Accordingly, it is possible to properly suppress the leakage of the magnetic flux to the recording medium M from the front end portion 24a of the main magnetic pole layer 24 at the time of the nonrecording operation.

In the perpendicular magnetic recording head having (1) described above, it is preferable that the inclination angle to θ1 to the track width direction (X direction shown in the drawing) of the front end face 35a in the sub-yoke layer 35 is in the range of 0 to 30 degrees.

(2) The main magnetic pole layer 24 includes an elongated front end portion 24a restricting the track width Tw, and a large-width portion 24b, which is provided in the rear of the height side of the end portion 24a, and has a track-widthwise width larger than the front end portion 24a. The main magnetic pole layer 24 has a large-width portion 24b having a track-widthwise width larger than the front end portion 24a. The front end face 35a of which a width T2 is larger than a width T1 of the large-width portion 24b and faces the opposed surface of the sub-yoke layer 35 retreats in the height direction from the opposed surface H1a. The large-width portion 24b of the main magnetic pole layer 24 is overlapped with the sub-yoke layer 35. The front end portion 24a projects in the front of the front end face 35a of the sub-yoke layer 35 so as to be exposed from the opposed surface H1a. At least a part of the front end face 35a is formed at the inclination angle θ1 to the direction parallel to the track width direction is 0 to 30 degrees. The front end face 35a formed at the inclination angle θ1 is opposed parallel to the height direction of the large-width portion 24b as viewed from a plane and is formed equal to or larger than of the width T1 of the large-width portion 24b. The main magnetic pole layer 24 is overlapped with the front end face region equal to or smaller than a half of a length L1 in the height direction of the sub-yoke layer 35. Refer to the descriptions of (1) for the parts overlapped with those described in (1).

In (2), the inclination angle θ1 to the track width direction (X direction shown in the drawing) of the front end face 35a in the sub-yoke layer 35 is restricted in the range of 0 to 30 degrees. As a result, the magnetic domain 35b formed in contact with at least a part of the front end face has dominant track-widthwise component in the sub-yoke layer 35.

As shown in FIG. 3, a dashed line A represents a half line of the length L1 of the sub-yoke layer 35. As shown in FIG. 3, the main magnetic pole layer 24 is overlapped with the sub-yoke layer 35 in the front side (opposed surface H1a) of the line A. FIG. 3 having (2) shows the most preferable embodiment. As shown in (1) described above, the reason is that the main magnetic pole layer 24 is overlapped with the magnetic domain 35b having dominant track-widthwise component, which is formed in contact with at least a part of the front end face 35a in the sub-yoke layer 35 and the entire main magnetic pole layer 24 is easily magnetized parallel to the track width direction (or at least the direction similar to the track width direction). As a result, it is possible to properly suppress the leakage of the magnetic flux to the recording medium from the front end portion 24a of the main magnetic pole layer 24.

In the embodiment of FIG. 3, when the large-width portion 24b of the main magnetic pole layer 24 extends in the height direction, a part of the large-width portion 24b is overlapped with the magnetic domain 35d having dominant heightwise component, thereby being influenced by the magnetic domain 35d. However, since a side close to the front end portion 24a of the large-width portion 24b is influenced by the magnetic domain 35b having dominant track-widthwise component, the front side of the main magnetic pole layer 24 including the front end portion 24a is easily magnetized parallel to the track width direction. It is possible to reduce an influence of the magnetic domain 35d to the height direction on the main magnetic pole layer 24 by forming the main magnetic pole layer 24 in the front side below the line A. As a result, it is possible to properly suppress the leakage of the magnetic flux to the recording medium M from the front end portion 24a of the main magnetic pole layer 24 in comparison with the known structure.

In the embodiment shown in FIG. 3, the front end face 35a is linearly formed from the center through the opposed side end faces 35c in the track width direction (X direction shown in the drawing) of the sub-yoke layer 35. In FIG. 3, the entire front end face 35a has the inclination angle θ1 of 0 to 30 degrees. However, a location having the inclination angle θ1 may be a part of the front end face 35a.

In one embodiment, it may be necessary that the angle θ1 of inclination to the track width direction of the front end face 35a which is opposed to the large-width portion 24b in parallel to the height direction (Y direction shown in the drawing) and has a width equal to or larger than the width T1 of the large-width portion 24b is in the range of 0 to 30 degrees. As a result, since the magnetic domain 35b having dominant track-widthwise component is easily formed in a region opposed to the large-width portion 24b (it is difficult that the magnetic domain having dominant heightwise component is formed), it is possible that the large-width portion 24b is properly opposed to the magnetic domain 35b. For example, a corner between the front end face 35a and the side end face 35c shown in FIG. 3 may be chamfered. In this embodiment, even if the inclination angle to the track width direction of the chamfering surface is higher than 30 degrees, the angle θ1 of inclination to the track width direction of the front end face 35a which is opposed to the large-width portion 24b in parallel to the height direction (Y direction shown in the drawing) and has a width equal to or larger than the width T1 of the large-width portion 24b is in the range of 0 to 30 degrees as viewed from a plane (see FIG. 3) in the front end face 35a. It is difficult that the magnetic domain having dominant heightwise component is formed in the sub-yoke layer 35, thereby properly controlling the magnetization of the large-width portion 24b. The front end face 35a may not have a linear shape as viewed from the plane, for example, the front end face 35a may have a curve shape. In this embodiment, the angle of inclination θ1 is restricted to the inclination angle to the track width direction of the tangent to a curve.

Hereinafter, a preferable configuration to be added to the configurations described in (1) and (2) will be described.

Figure 5:
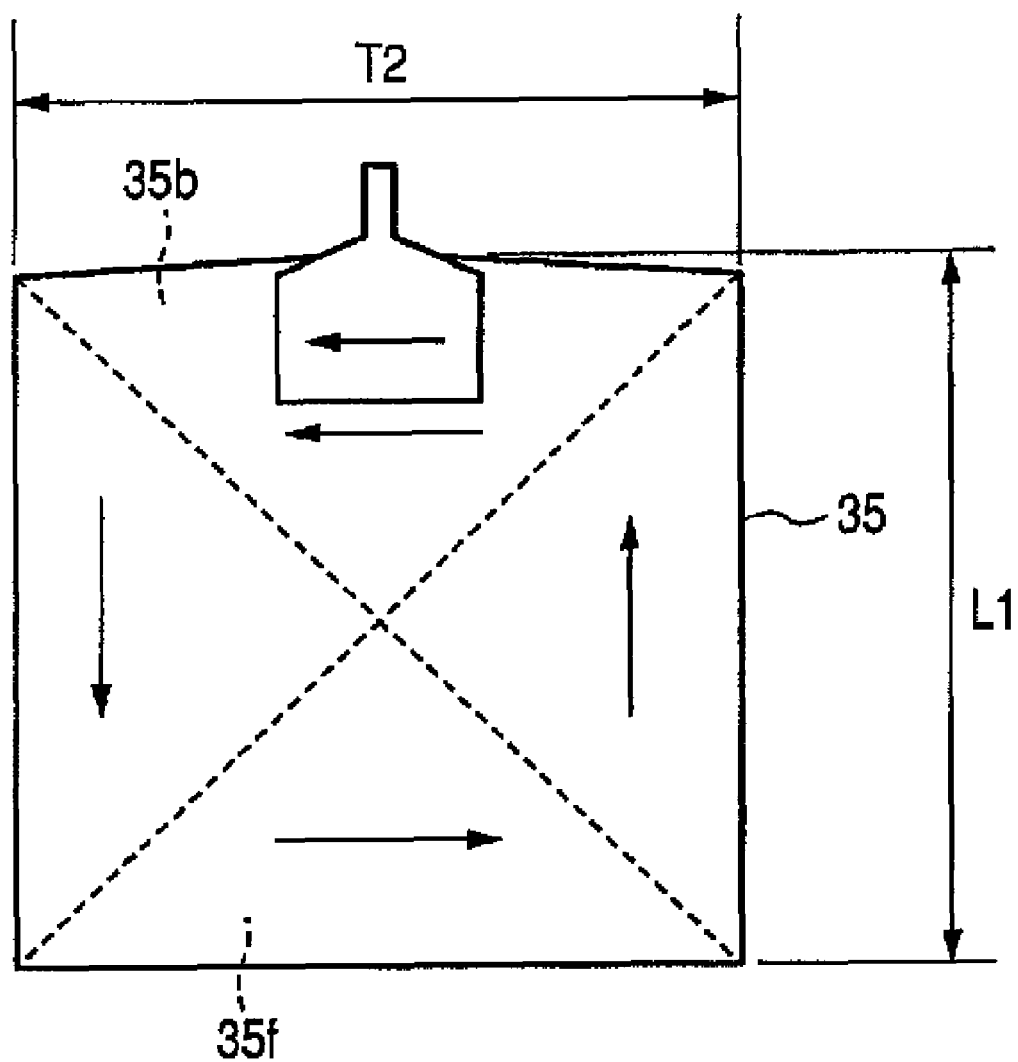
FIG. 5 is a plan view of a sub-yoke layer and a main magnetic pole layer according to one embodiment.

It is preferable that the ratio (T2/L1) between a width T2 in the track width direction and the length L1 in the height direction of the sub-yoke layer 35 is equal to or more than 1. For example, it is preferable that the width T2 is equal to or more than 1. As a result, the area where the magnetic domains 35d and 35d having dominant heightwise component occupy becomes smaller and the area where the magnetic domains 35b and 35f having dominant track-widthwise component becomes larger. In FIG. 5, the magnetic domains 35b and 35f having dominant track-widthwise component are in point-contact with each other substantially in the vicinity of the center of the sub-yoke layer 35. However, the ratio (T2/L1) is more than 1, the magnetic domains 35b and 35f are opposed to each other along a magnetic domain wall lengthily extending substantially in the track width direction (X direction shown in the drawing) in the center of the sub-yoke layer 35. In this embodiment, even if the large-width portion 34b of the main magnetic pole layer 24 extends lengthily in the height direction (Y direction shown in the drawing), most of the large-width portion 24b is overlapped with the magnetic domain having dominant track-widthwise component.

When the ratio (T2/L1) is equal to or more than 1.29, the magnetic domain 35b formed in contact with the front end face 35a of the sub-yoke layer 35, facing the track width and the magnetic domain 35f formed in contact with the height rear end face 35e of the sub-yoke layer 35, facing the track width are opposed to each other along the magnetic domain wall lengthily extending substantially in the vicinity of the center of the sub-yoke layer 35 in the track width direction. Therefore, the magnetic domain having dominant track-widthwise component is typically formed in a predetermined width in the track width direction from the front end face 35a to the rear end face 35e of the sub-yoke layer 35. Accordingly, it is possible that the entire expansion portion 24b of the main magnetic pole layer 24 is easily and properly overlapped with the magnetic domain having dominant track-widthwise component.

As shown in FIG. 3, the sub-yoke layer 35 includes the front end face 35a, the side end face 35c, and the rear end face 35e. It is most preferable that the side end face 35c is formed parallel to the height direction (Y direction shown in the drawing), the front end face 35a has the inclination angle θ1, and the rear end face 35e is formed parallel to the track width direction (X direction shown in the drawing). As the result, almost four magnetic domains are formed and the magnetic domain 35b having dominant track-widthwise component is easily formed in a larger area of the front end face 35a.

In one embodiment, it is preferable that the track width Tw is in the range of 0.06 μm to 0.30 μm. It is preferable that the width T1 (maximum width) of the large-width portion 24b is in the range of 0.5 μm to 10 μm. It is preferable that the width T2 (maximum width) of the sub-yoke layer 35 is formed in the range of 1 μm to 30 μm. In addition, it is preferable that the length L1 (maximum length) in the height direction of the sub-yoke layer 35 is formed in the range of 5 μm to 30 μm.

The structure of the perpendicular magnetic recording head shown in FIG. 1 is an example.

For example, as shown in FIG. 2, the main magnetic pole layer 24 and the sub-yoke layer 35 may be positioned in the upper side of the return yoke layer 21 and the sub-yoke layer 35 and the return yoke layer 21 may be in magnetic contact with a contact layer 26 interposed therebetween. Reference numeral 56 shown in FIG. 2 represents a coil insulating foundation layer and reference numeral 57 is a gap layer. A reference numeral shown in FIG. 2 that is the same as the reference numeral shown in FIG. 1 generally represents a layer that is the same as the layer of FIG. 1. The main magnetic pole layer 24 shown in FIGS. 1 and 2 is formed in the upper side of the sub-yoke layer 35, but may be formed in the lower side of the sub-yoke layer 35.

EXAMPLES

In a test, a magnetic body formed of FeCo is coated in a shape shown in FIGS. 7 to 10 and the magnetic domain formed in each magnetic body is observed with a magnetic force microscope (MFM).

First Example

Figure 6:
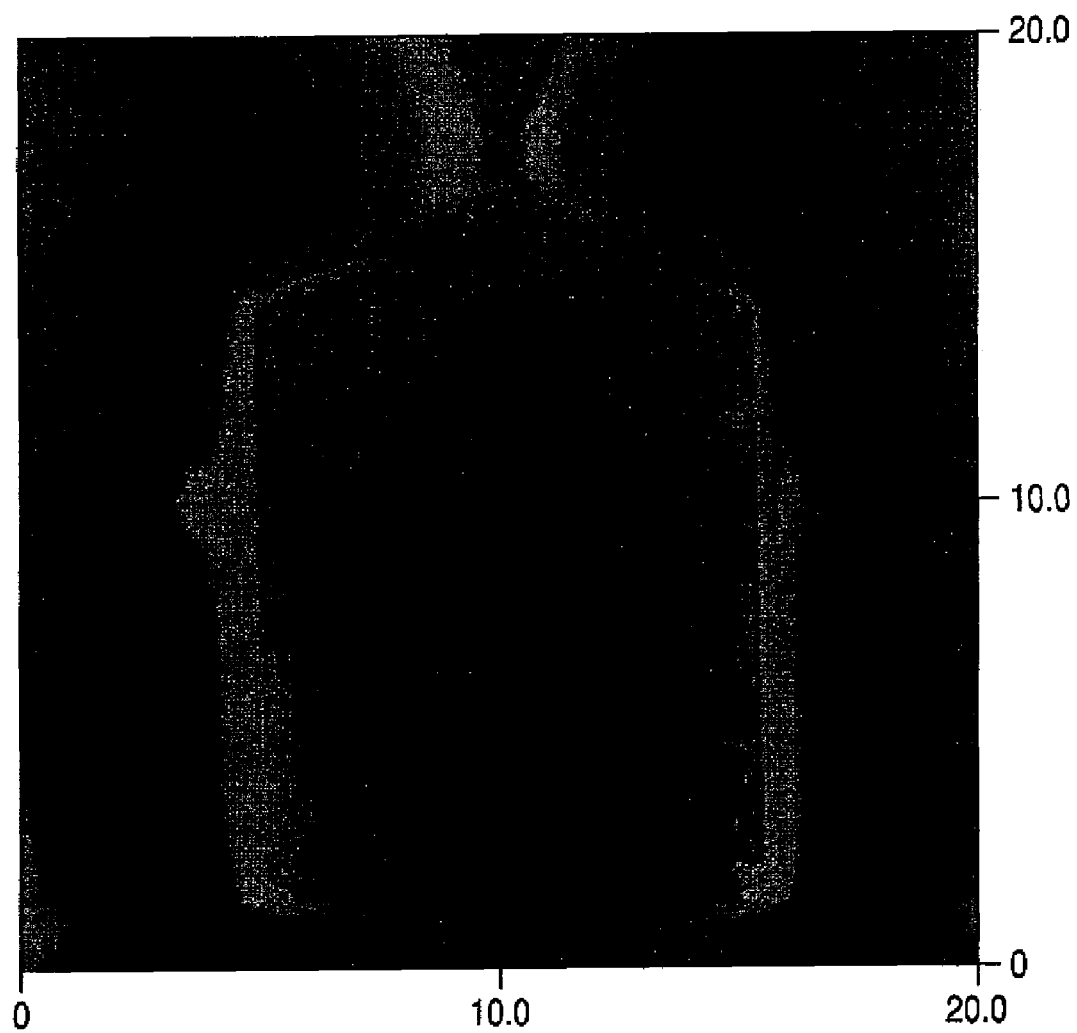
FIG. 6 shows a magnetic force microscope (MFM) of a magnetic body where a width is 10 μm, a heightwise length is 15.5 μm, and an inclination angle to a track width direction of a front end face is 30 degrees.

Magnetic Body Shown in FIG. 6

Figure 11:
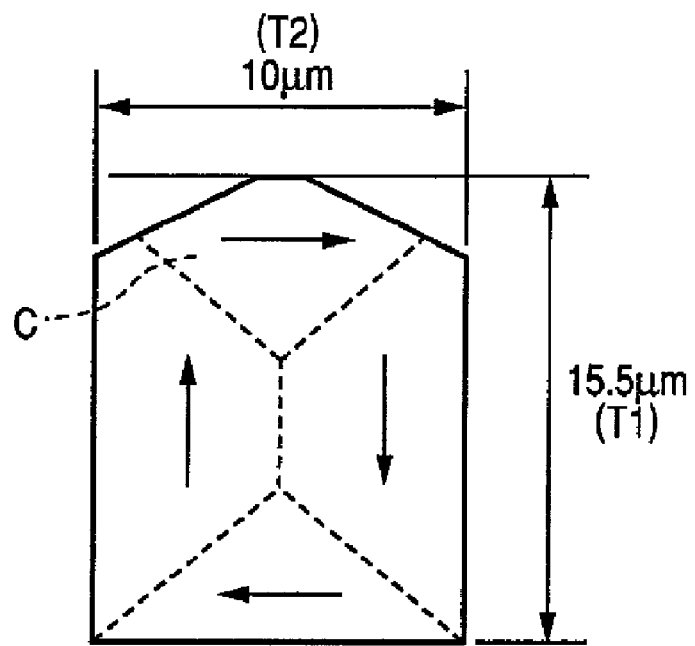
FIG. 11 is a view showing a frame format of FIG. 6.

FIG. 11 is a view showing a frame format of a magnetic body shown in FIG. 6. As shown in FIG. 11, a width is set to 10 μm and a heightwise length is set to 15.5 μm. The inclination angle to the track width direction of the front end face of the magnetic body is set to 30 degrees.

Second Example

Figure 7:
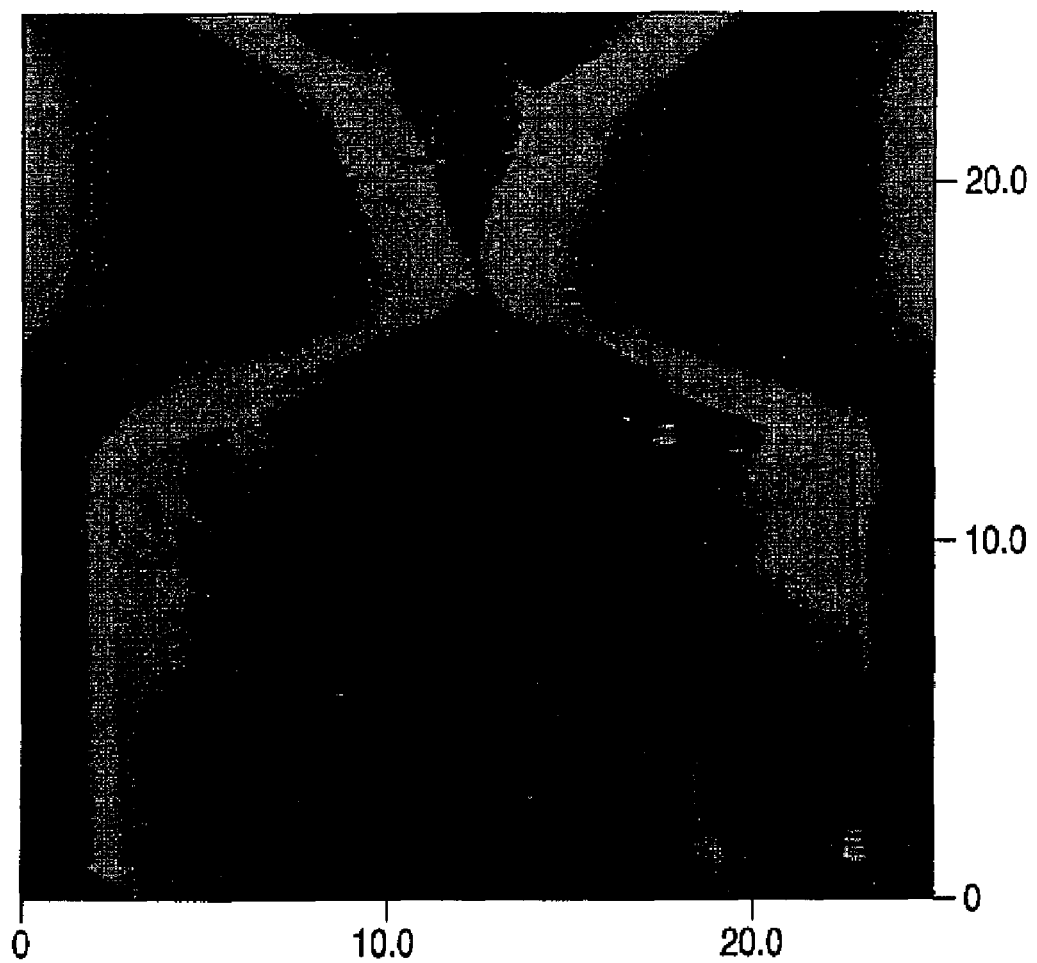
FIG. 7 shows a magnetic force microscope (MFM) of a magnetic body where a width is 20 μm, a heightwise length is 15.5 μm, and an inclination angle to a track width direction of a front end face is 30 degrees.

Magnetic Body Shown in FIG. 7

Figure 12:
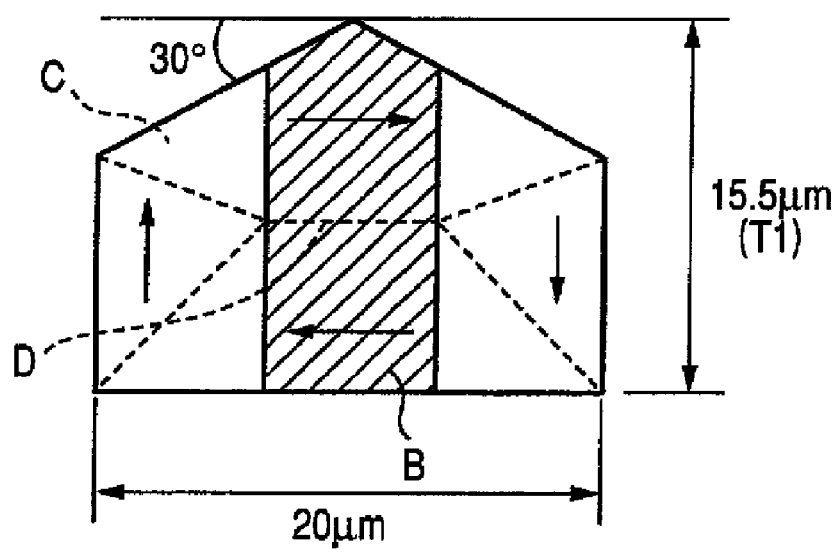
FIG. 12 is a view showing a frame format of FIG. 7.

FIG. 12 is a view showing a frame format of the magnetic body shown in FIG. 7. As shown in FIG. 12, a width is set to 20 μm and a heightwise length is set to 15.5 μm. The inclination angle to the track width direction of the front end face of the magnetic body is set to 30 degrees.

Third Example

Figure 8:
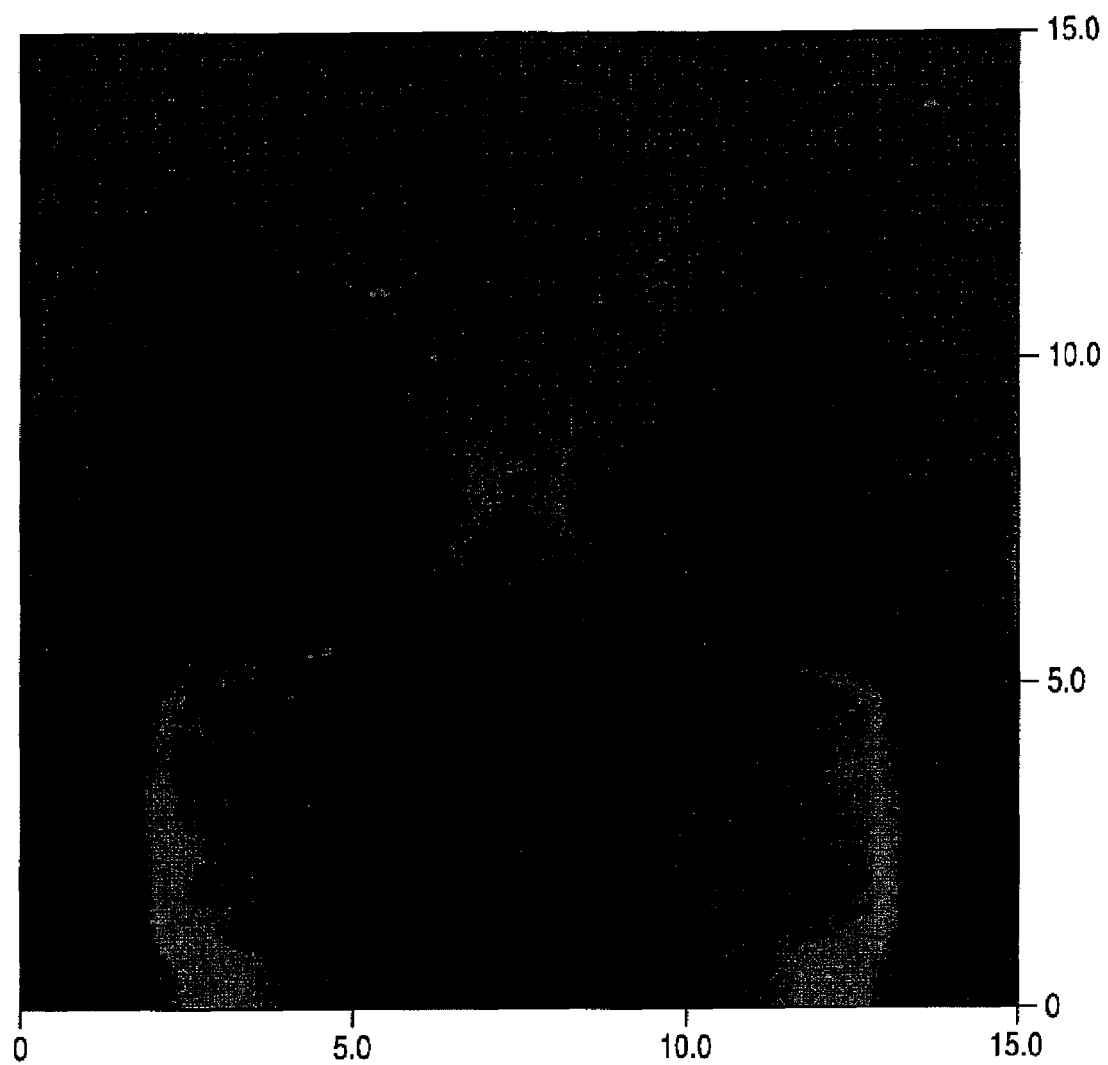
FIG. 8 shows a magnetic force microscope (MFM) of a magnetic body where a width is 10 μm, a heightwise length is 5 μm, and an inclination angle to a track width direction of a front end face is 30 degrees.

Magnetic Body Shown in FIG. 8

Figure 13:
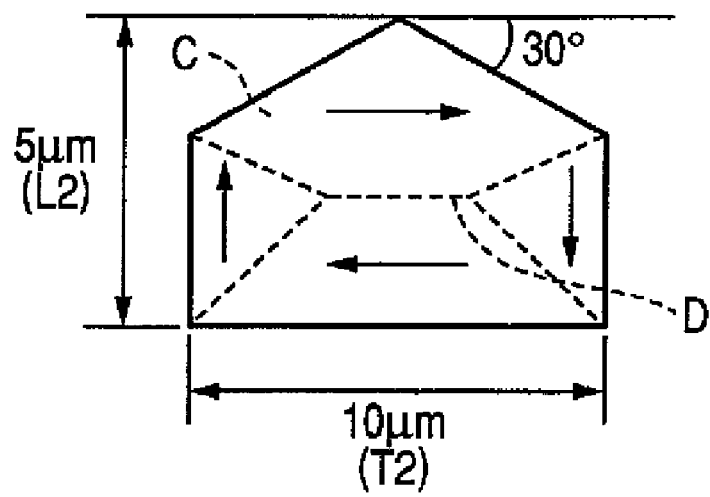
FIG. 13 is a view showing a frame format of FIG. 8.

FIG. 13 is a view showing a frame format of the magnetic body shown in FIG. 8. As shown in FIG. 13, a width is set to 10 μm and a heightwise length is set to 5 μm. The inclination angle to the track width direction of the front end face of the magnetic body is set to 30 degrees.

Comparative Example

Figure 9:
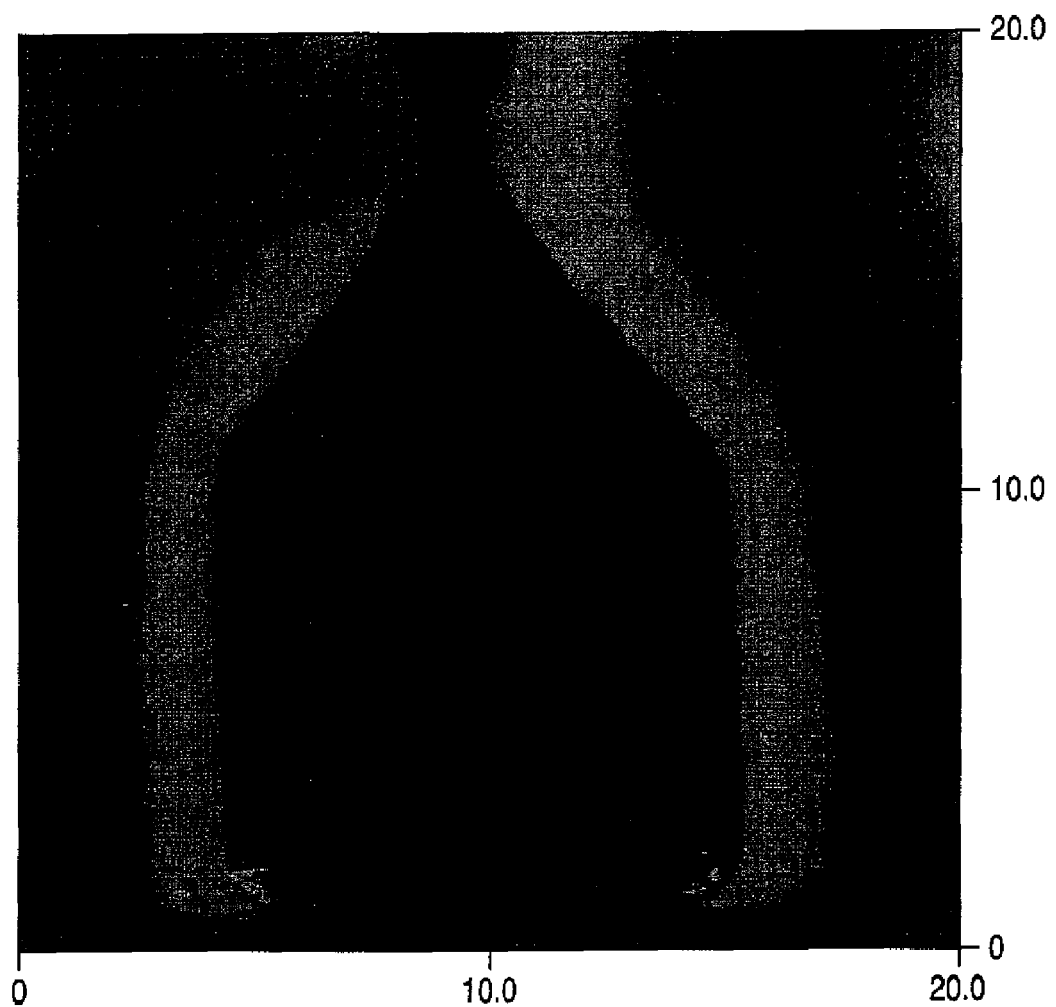
FIG. 9 shows a magnetic force microscope (MFM) of a magnetic body where a width is 10 μm, a heightwise length is 15.5 μm, and an inclination angle to a track width direction of a front end face is 50 degrees.

Magnetic Body Shown in FIG. 9

Figure 14:
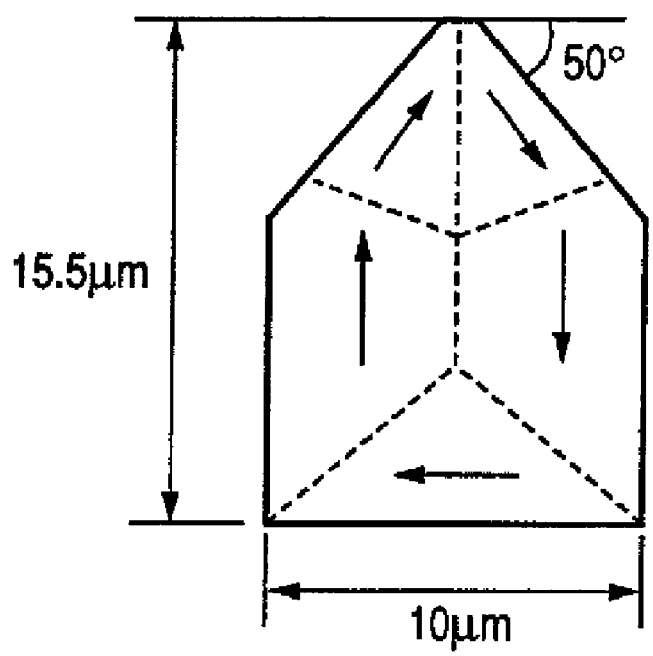
FIG. 14 is a view showing a frame format of FIG. 9.

FIG. 14 is a view showing a frame format of the magnetic body shown in FIG. 9. As shown in FIG. 14, a width is set to 10 μm and a heightwise length is set to 15.5 μm. The inclination angle to the track width direction of the front end face of the magnetic body is set to 50 degrees.

Fourth Example

Figure 10:
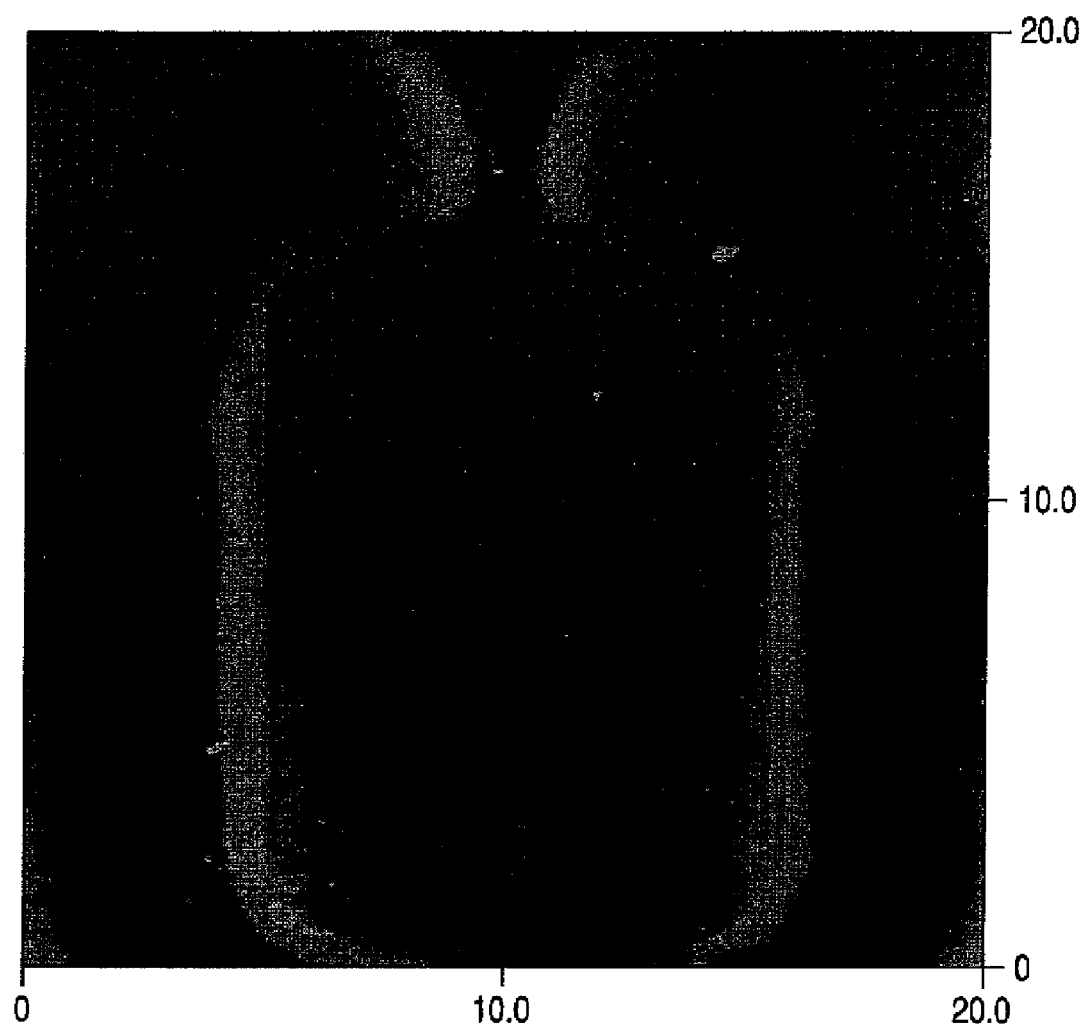
FIG. 10 shows a magnetic force microscope (MFM) of a magnetic body where a width is 10 μm, a heightwise length is 15.5 μm, and an inclination angle to a track width direction of a front end face is 0 degree.

Magnetic Body Shown in FIG. 10

Figure 15:
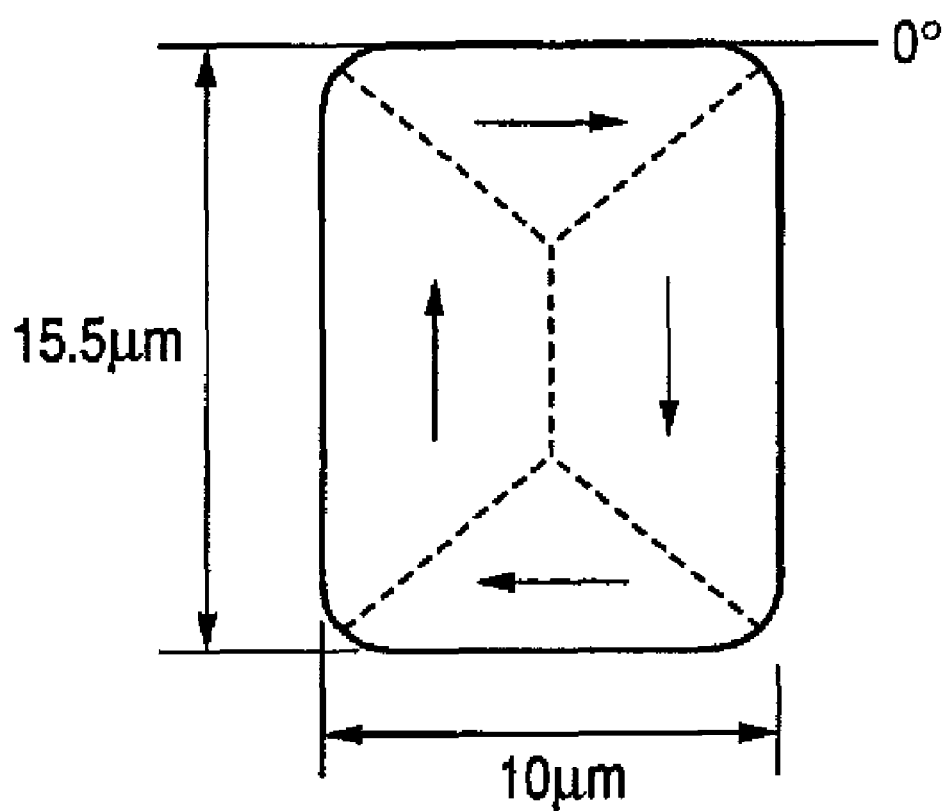
FIG. 15 is a view showing a frame format of FIG. 10.
Figure 16:
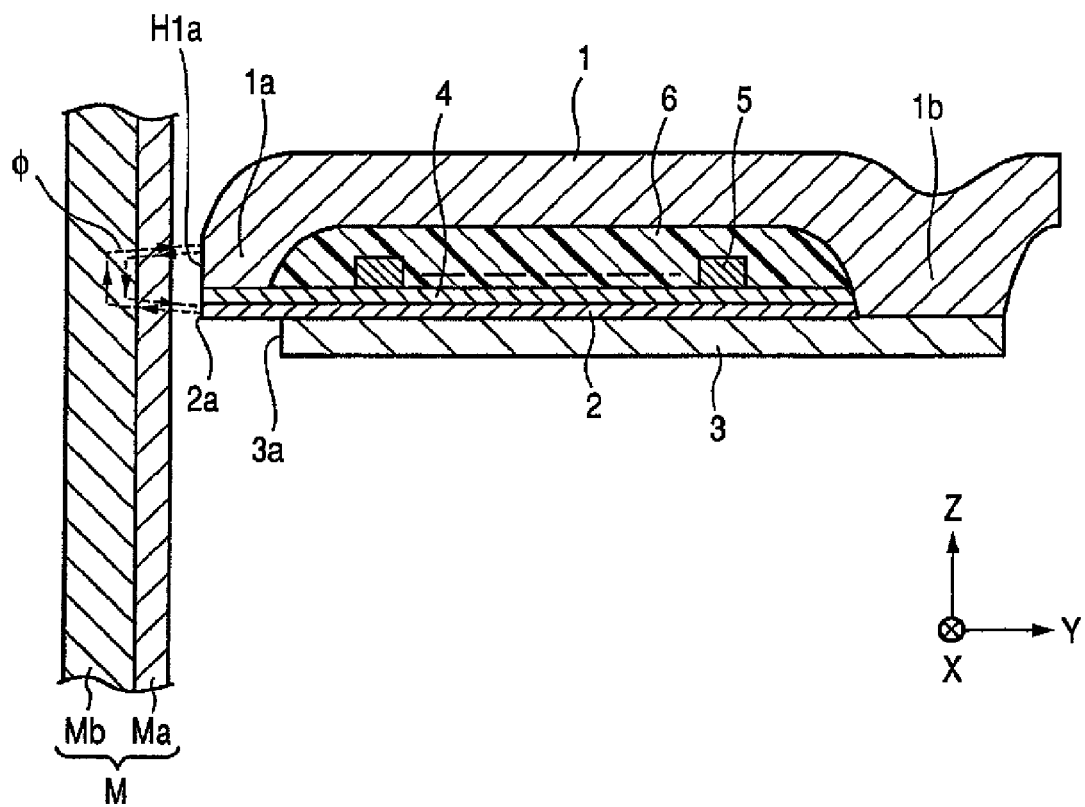
FIG. 16 is a fragmentary cross-sectional view of a known perpendicular magnetic recording head as viewed from a direction parallel to a film thickness direction (Z direction shown in the drawing) to a height direction (Y direction shown in the drawing).
Figure 17A:
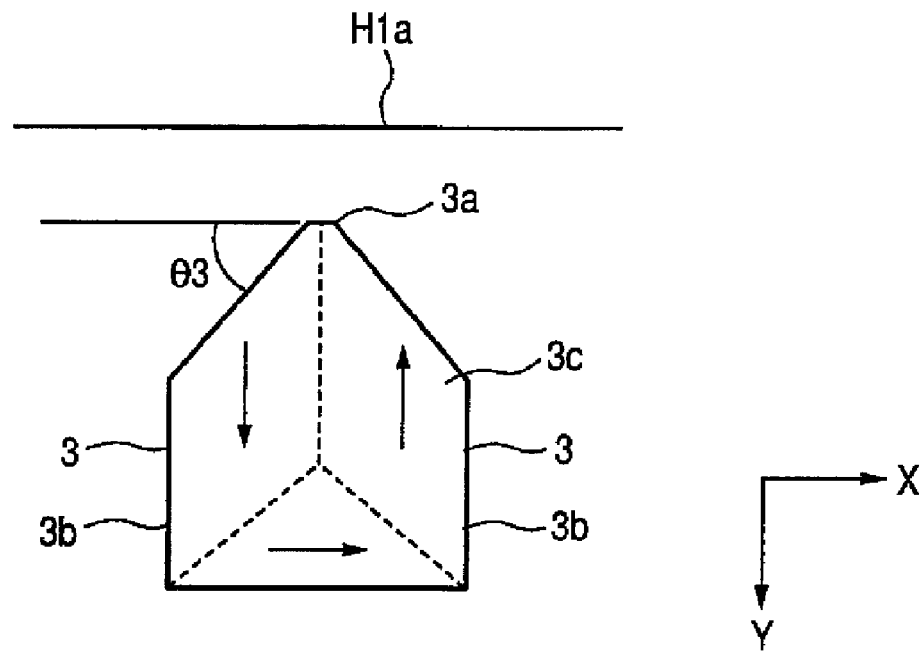
FIG. 17A is a plan view showing a magnetic domain structure of a known sub-yoke layer and FIG. 17B is a plan view showing a magnetic domain structure of a known main magnetic pole layer.
Figure 17B:
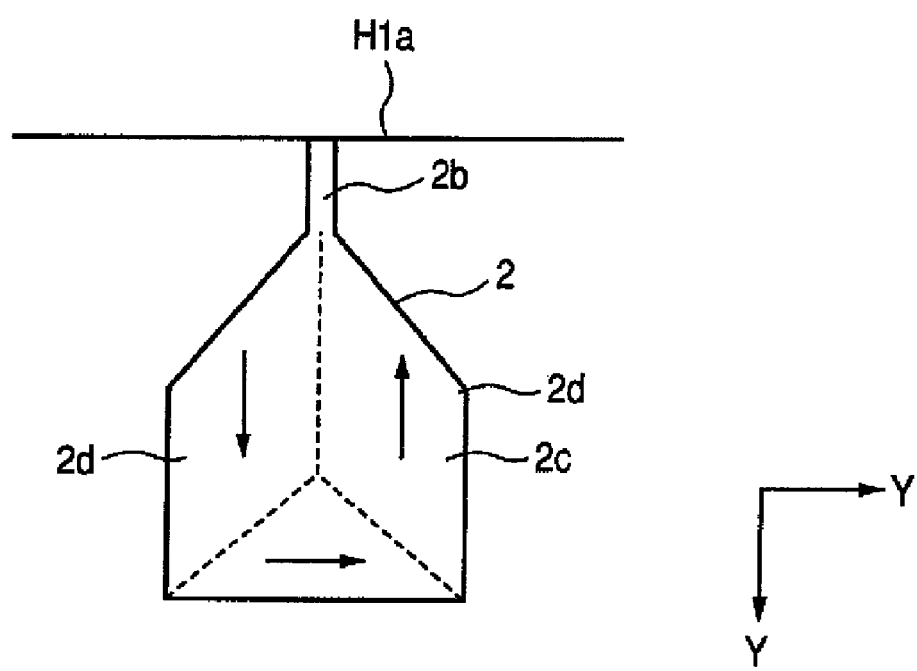

FIG. 15 is a view showing a frame format of the magnetic body shown in FIG. 7. As shown in FIG. 15, a width is set to 10 μm and a heightwise length is set to 15.5 μm. The inclination angle to the track width direction of the front end face of the magnetic body is set to 0 degree.

As shown in FIGS. 6 to 8 (views showing the frame format shown in FIGS. 11 to 13), each magnetic body has the multi-magnetic domain structure. By the configuration of the magnetic domain, it is possible to presume that spontaneous magnetization directions in the respective magnetic domains are directions shown in FIGS. 11 to 13. Particularly, in the magnetic domain C formed in contact with the front end face of each magnetic body, the track-widthwise component of a magnetic moment becomes larger than the heightwise component of the magnetic moment and the spontaneous magnetization direction is parallel to the track width direction or faces a direction similar to the track width direction.

As shown in FIGS. 11 to 13, when the ratio between the width T2 and the length L1 (T2/L1) is changed, the magnetic domain structure is changed. The ratio is approximately 0.645 in FIG. 11, the ratio is approximately 1.29 in FIG. 12, and the ratio is 2 in FIG. 13.

In FIGS. 12 and 13, the magnetic domains having dominant track-widthwise component are opposed to each other with the magnetic domain wall D formed lengthily parallel to the track width direction. In the present embodiment, the magnetic domain having dominant track-widthwise component is formed in a predetermined region in the track width direction from the front end face to the rear end face (for example, see a slant line region B shown in FIG. 12). Therefore, in the case that the magnetic body of the embodiment described in FIG. 12 or FIG. 13 is used as the sub-yoke layer, the main magnetic pole layer is easily overlapped with the magnetic domain having dominant track-widthwise component of the sub-yoke layer. For example, when the main magnetic pole layer is overlapped with the slant line region B shown in FIG. 12, the main magnetic pole layer is properly overlapped with the magnetic domain having dominant track-widthwise component.

From the test result, in the present embodiment, it is preferable that the ratio is equal to or more than 1.29.

In the comparative example shown in FIG. 9 (the view showing the frame format shown in FIG. 14), the inclination angle to the track width direction of the front end face is set to 5 degrees. However, as the result, the magnetic domain having dominant heightwise component is formed in the vicinity of the front end face.

In the embodiment shown in FIG. 10 (the view showing the frame format shown in FIG. 15), the inclination angle to the track width direction of the front end face is set to 0 degree. However, as the result, the magnetic domain having dominant track-widthwise component is formed in the vicinity of the front end face. From the test result shown in FIGS. 6 to 15, the inclination angle to the track width direction of the front end face is set to the range of 0 to 30 degrees. As the result, the magnetic domain having dominant track-widthwise component is formed in the vicinity of the front end face.

Various embodiments described herein can be used alone or in combination with one another. The forgoing detailed description has described only a few of the many possible implementations of the present invention. For this reason, this detailed description is intended by way of illustration, and not by way of limitation. It is only the following claims, including all equivalents that are intended to define the scope of this invention.

What is claimed is:

1. A perpendicular magnetic recording head, comprising:
a main magnetic pole layer;
a sub-yoke layer formed in contact with the main magnetic pole layer; and
a coil layer that applies a magnetic field to the main magnetic pole layer and the sub-yoke layer,
wherein the main magnetic pole layer has an elongated front end portion restricting a track width Tw and a large-width portion having a width larger in a track width direction than that of the front end portion, which is provided in the rear of a height side of the front end portion,
wherein a front end face of the sub-yoke layer that faces an opposed surface retreats in a height direction from the opposed surface, the large-width portion of the main magnetic pole layer is overlapped with the sub-yoke layer, and the front end portion projects in a front of the front end face so as to be exposed from the opposed surface,
wherein the sub-yoke layer has a multi-magnetic domain structure and the magnetic domain having a track-widthwise component larger than a heightwise component is formed in contact with at least a part of the front end face when the heightwise component of a magnetic moment is compared with the track-widthwise component of the magnetic moment, and
wherein an area equal to or larger than a half of a region of the main magnetic pole layer overlapped with the sub-yoke layer is overlapped with the magnetic domain having the larger track-widthwise component.

2. The perpendicular magnetic recording head according to claim 1, wherein the sub-yoke layer has the multi-magnetic domain structure and the magnetic domain having the track-widthwise parallel component larger than the heightwise component is formed in contact with at least a part of the front end face when the heightwise component of the magnetic moment is compared with the track-widthwise component of the moment, and
wherein an area equal to or larger than a half of a region of the main magnetic pole layer overlapped with the sub-yoke layer is overlapped with the magnetic domain having the larger track-widthwise component.

3. The perpendicular magnetic recording head according to claim 1, wherein the entire area of the main magnetic pole layer overlapped with the sub-yoke layer is overlapped with the magnetic domain having the larger track-widthwise component.

4. The perpendicular magnetic recording head according to claim 1, wherein the ratio of the width in the track width direction of the sub-yoke layer to the heightwise length of the sub-yoke layer(the width/the length) is equal to or larger than 1.

5. A perpendicular magnetic recording head, comprising:
a main magnetic pole layer;
a sub-yoke layer formed in contact with the main magnetic pole layer; and
a coil layer that applies a magnetic field to the main magnetic pole layer and the sub-yoke layer,
wherein the main magnetic pole layer has an elongated front end portion restricting a track width and a large-width portion having a width larger in a track width direction than that of the front end portion, which is provided in the rear of a height side of the front end portion,
wherein a width of the sub-yoke layer in the track width direction is larger than the width of the large-width portion, a front end face of the sub-yoke layer that faces an opposed surface retreats in a height direction from the opposed surface, the large-width portion of the main magnetic pole layer is overlapped with the sub-yoke layer, and the front end portion projects in the front of the front end face of the sub-yoke layer so as to be exposed from the opposed surface,
wherein at least a part of the front end face is formed at the inclination angle θ1 about a direction parallel to the track width direction in the range of 0 to 30 degrees, and the front end face formed at the inclination angle θ1 is opposed to the large-width portion to be parallel to the height direction as viewed from a plane and has a width equal to or larger than of the width of the large-width portion, and wherein the main magnetic pole layer is overlapped with an area of the front end face area equal to or smaller than a half of a heightwise length of the sub-yoke layer.

6. The perpendicular magnetic recording head according to claim 5, wherein the sub-yoke layer has a multi-magnetic domain structure and the magnetic domain having a track-widthwise parallel component larger than a heightwise component is formed in contact with at least a part of the front end face when a component parallel to a height direction of a magnetic moment is compared with a component parallel to a track width direction of the moment, and wherein an area equal to or larger than a half of a region of the main magnetic pole layer overlapped with the sub-yoke layer is overlapped with the magnetic domain having the larger track-widthwise component.

7. The perpendicular magnetic recording head according to claim 5, wherein the entire area of the main magnetic pole layer overlapped with the sub-yoke layer is overlapped with the magnetic domain having the larger track-widthwise component.

8. The perpendicular magnetic recording head according to claim 2, wherein the ratio of the width in the track width direction of the sub-yoke layer to the heightwise length of the sub-yoke layer (the width/the length) is equal to or larger than 1.

9. A perpendicular magnetic recording head, comprising:
a main magnetic pole layer;
a sub-yoke layer formed in contact with the main magnetic pole layer; and
a coil layer that applies a magnetic field to the main magnetic pole layer and the sub-yoke layer,
wherein the sub-yoke layer includes a multi-magnetic domain structure,
wherein an area equal to or larger than a half of a region of the main magnetic pole layer overlapped with the sub-yoke layer is overlapped with the multi-magnetic domain structure having a larger track-widthwise component,
wherein the magnetic domain has a track-widthwise component larger than a heightwise component formed in contact with at least a part of a front end face of the sub-yoke layer when the heightwise component of a magnetic moment is compared with the track-widthwise component of the magnetic moment.

10. The perpendicular magnetic recording head according to claim 9, wherein the sub-yoke layer has the multi-magnetic domain structure and the magnetic domain having the track-widthwise parallel component larger than the heightwise component is formed in contact with at least a part of the front end face when the heightwise component of the magnetic moment is compared with the track-widthwise component of the moment.

11. The perpendicular magnetic recording head according to claim 9, wherein the entire area of the main magnetic pole layer overlapped with the sub-yoke layer is overlapped with the magnetic domain having the larger track-widthwise component.

12. The perpendicular magnetic recording head according to claim 9, wherein the ratio of the width in the track width direction of the sub-yoke layer to the heightwise length of the sub-yoke layer (the width/the length) is equal to or larger than 1.

13. A perpendicular magnetic recording head, comprising:
a main magnetic pole layer;
a sub-yoke layer formed in contact with the main magnetic pole layer; and
a coil layer for applying a magnetic field to the main magnetic pole layer and the sub-yoke layer,
wherein at least a part of a front end face of the sub-yoke layer is formed at an inclination angle θ1 about a direction parallel to a track width direction in the range of 0 to 30 degrees, and the front end face formed at the inclination angle θ1 is opposed to a large-width portion of the main magnetic pole layer to be parallel to a height direction as viewed from a plane and has a width equal to or larger than of a width of the large-width portion, and
wherein the main magnetic pole layer is overlapped with an area of the front end face area equal to or smaller than a half of a heightwise length of the sub-yoke layer,
wherein the main magnetic pole layer has an elongated front end portion restricting a track width Tw and the width of the large-width portion is larger in the track width direction than that of the front end portion, which is provided in the rear of a height side of the front end portion,
wherein the sub-yoke layer has a multi-magnetic domain structure and the magnetic domain having a track-widthwise parallel component larger than a heightwise component is formed in contact with at least a part of the front end face when a component parallel to the height direction of a magnetic moment is compared with a component parallel to the track width direction of the moment, and wherein an area equal to or larger than a half of a region of the main magnetic pole layer overlapped with the sub-yoke layer is overlapped with the magnetic domain having the larger track-widthwise component, and
wherein a width of the sub-yoke layer in the track width direction is larger than the width of the large-width portion, the front end face hfacing an opposed surface retreats in the height direction from the opposed surface, the large-width portion is overlapped with the sub-yoke layer, and the front end portion projects in the front of the front end face so as to be exposed from the opposed surface.

14. The perpendicular magnetic recording head according to claim 13, wherein the entire area of the main magnetic pole layer overlapped with the sub-yoke layer is overlapped with the magnetic domain having the larger track-widthwise component.

15. The perpendicular magnetic recording head comprising:
a main magnetic pole layer;
a sub-yoke layer formed in contact with the main magnetic pole layer; and
a coil layer for applying a magnetic field to the main magnetic pole layer and the sub-yoke layer,
wherein at least a part of a front end face of the sub-yoke layer is formed at an inclination angle θ1 about a direction parallel to a track width direction in the range of 0 to 30 degrees, and the front end face formed at the inclination angle θ1 is opposed to a large-width portion of the main magnetic pole layer to be parallel to a height direction as viewed from a plane and has a width equal to or larger than of a width of the large-width portion,
wherein the main magnetic pole layer has an elongated front end portion restricting a track width Tw and the width of the large-width portion is larger in the track width direction than that of the front end portion, which is provided in the rear of a height side of the front end portion, wherein the entire area of the main magnetic pole layer overlapped with the sub-yoke layer is overlapped with the magnetic domain having the larger track-widthwise component, and wherein a width of the sub-yoke layer in the track width direction is larger than the width of the large-width portion, the front end face facing an opposed surface retreats in the height direction from the opposed surface, the large-width portion is overlapped with the sub-yoke layer, and the front end portion projects in the front of the front end face so as to be exposed from the opposed surface.

16. The perpendicular magnetic recording head according to claim 15, wherein the entire area of the main magnetic pole layer overlapped with the sub-yoke layer is overlapped with the magnetic domain having the larger track-widthwise component.

* * * * *